(12) United States Patent
Cook

(10) Patent No.: US 7,505,452 B2
(45) Date of Patent: *Mar. 17, 2009

(54) SYSTEMS AND METHODS FOR PROVIDING POOLED ACCESS IN A TELECOMMUNICATIONS NETWORK

(75) Inventor: Charles I. Cook, Louisville, CO (US)

(73) Assignee: Qwest Communications International Inc., Denver, CO (US)

( * ) Notice: Subject to any disclaimer, the term of this patent is extended or adjusted under 35 U.S.C. 154(b) by 37 days.

This patent is subject to a terminal disclaimer.

(21) Appl. No.: 11/175,576

(22) Filed: Jul. 5, 2005

(65) Prior Publication Data

US 2005/0243808 A1    Nov. 3, 2005

Related U.S. Application Data

(63) Continuation of application No. 10/434,428, filed on May 7, 2003, now Pat. No. 6,931,024.

(51) Int. Cl.
*H04L 12/66* (2006.01)

(52) U.S. Cl. .................... 370/352; 379/15.03

(58) Field of Classification Search .......... None
See application file for complete search history.

(56) References Cited

U.S. PATENT DOCUMENTS

| | | | |
|---|---|---|---|
| 5,282,241 A | 1/1994 | Aoki et al. | |
| 5,319,700 A | 6/1994 | Mano et al. | |
| 5,337,348 A | 8/1994 | Yamazaki et al. | |
| 5,339,355 A | 8/1994 | Mori et al. | |
| 5,408,522 A | 4/1995 | Ikehata et al. | |
| 5,477,531 A | 12/1995 | McKee et al. | |
| 5,722,048 A | 2/1998 | Javitt | |
| 5,963,540 A | 10/1999 | Bhaskaran | |
| 5,974,331 A | 10/1999 | Cook et al. | |
| 6,049,699 A | 4/2000 | Javitt | |
| 6,055,414 A | 4/2000 | Javitt | |
| 6,070,057 A | 5/2000 | Javitt | |
| 6,072,793 A | 6/2000 | Dunn et al. | |
| 6,137,990 A | 10/2000 | Javitt | |
| 6,240,295 B1 | 5/2001 | Kennedy, III | |
| 6,266,523 B1 | 7/2001 | Cook et al. | |
| 6,275,709 B1 | 8/2001 | Do | |
| 6,349,093 B1 | 2/2002 | Caldwell et al. | |
| 6,353,746 B1 | 3/2002 | Javitt | |
| 6,396,975 B1 | 5/2002 | Wood et al. | |
| 6,445,842 B1 | 9/2002 | Dhuler et al. | |
| 6,470,074 B2 | 10/2002 | Teixeria | |
| 6,490,382 B1 | 12/2002 | Hill | |
| 6,507,565 B1 | 1/2003 | Taylor | |
| 6,512,755 B1 | 1/2003 | Deschaine et al. | |
| 6,529,909 B1 | 3/2003 | Bowman-Amuah | |
| 6,535,311 B1 | 3/2003 | Lindquist | |

(Continued)

*Primary Examiner*—Robert W Wilson
(74) *Attorney, Agent, or Firm*—Townsend and Townsend and Crew LLP

(57) ABSTRACT

A dynamically provisioned telecommunications system and methods for using such. Various of the systems include an automated carrier layer that is operable to direct one of at least two access sources to a subscriber line, and an automated service layer that is operable to direct an access request associated with the subscriber line to one of at least two service pools. In some cases, one or more electromechanical cross-connects are used to switch network signaling.

12 Claims, 11 Drawing Sheets

U.S. PATENT DOCUMENTS

| | | |
|---|---|---|
| 6,546,004 B2 | 4/2003 | Gullicksen |
| 6,546,163 B2 | 4/2003 | Thackara |
| 6,549,587 B1 | 4/2003 | Li |
| 6,549,949 B1 | 4/2003 | Bowman-Amuah |
| 6,550,057 B1 | 4/2003 | Bowman-Amuah |
| 6,571,030 B1 * | 5/2003 | Ramaswami et al. .......... 385/17 |
| 6,584,500 B1 * | 6/2003 | Arkko ........................ 370/352 |
| 6,618,371 B1 * | 9/2003 | Cao ........................... 370/388 |
| 6,618,518 B1 | 9/2003 | Mahadevan et al. |
| 6,671,149 B1 * | 12/2003 | Chea et al. .................... 361/87 |
| 6,931,024 B2 * | 8/2005 | Cook ......................... 370/465 |

\* cited by examiner

SYSTEMS AND METHODS FOR PROVIDING POOLED ACCESS IN A TELECOMMUNICATIONS NETWORK

CROSS-REFERENCES TO RELATED APPLICATIONS

The present application is a continuation of U.S. patent application Ser. No. 10/434,428, entitled "SYSTEMS AND METHODS FOR PROVIDING POOLED ACCESS IN A TELECOMMUNICATIONS NETWORK," filed May 7, 2003 by Charles I. Cook, the entire disclosure of which is incorporated herein by reference for all purposes The present application is related to U.S. patent application Ser. No. 10/434,429, entitled "AUTOMATED CROSS-BOX AND METHODS FOR USING AN AUTOMATED CROSS-BOX", and assigned to an entity common herewith. The aforementioned patent application is incorporated herein by reference for all purposes, and is filed on a date even herewith.

BACKGROUND OF THE INVENTION

The present invention is related to telecommunications networks, and in particular to provisioning and/or accessing pooled resources in a telecommunications network.

A typical telecommunications network is depicted in FIG. 1. As illustrated, telecommunications network 100 includes a number of network devices 123, 125, 127 maintained at a connection location 120. Each of the network devices is coupled to a respective subscriber access 133, 135, 137 and thereby provides access to services supported by central office 110. Thus, when a subscriber accesses telecommunications network 100, the access is performed via the assigned network device. This approach is wasteful as a particular subscriber may only use an associated network device for a limited portion of a day.

It has been proposed to pool various telecommunications resources in a voice network. However, it is not evident how such a pooling scheme could be used where the network includes relatively high frequency data signals and associated network devices, or where a packet based network is employed. Hence, there exists a need in the art for advanced systems and methods for pooling network devices in a network where high speed data network signals are present and/or packet based networks are employed.

BRIEF SUMMARY OF THE INVENTION

Among other things, the present invention provides systems and methods for pooling data services in relation to a telecommunications network. In doing so, the present invention provides a pooling approach that addresses the frequency response needed in relation to current high speed data networks, and/or addresses issues related to pooling in a packet based network environment. Further, the present invention provides systems and methods for automated cross-connecting of signals in a telecommunications network. Such cross-connecting can be provided in relation to accessing pooled network devices, and/or in relation to selecting between a plurality of access sources.

To provide a desirable frequency response, an electromechanical cross-connect can be employed. Such an electromechanical cross-connect can provide a physically switched approach that reduces the frequency filtering evident where transistor based switching is used. The control associated with the electromechanical cross-connect can be provided via a transistor based device, however, without degrading the frequency response.

Some embodiments of the present invention provide dynamically provisioned telecommunications systems. The systems include an automated carrier layer that is operable to direct one of at least two access sources to a subscriber line. In addition, the systems include an automated service layer that is operable to direct an access request associated with the subscriber line to one of at least two service pools, and/or to one of at least two service devices. In some cases, the access sources are high frequency access sources including, for example, a digital subscriber line ("xDSL") access source. In some cases, one or more of the access sources is a plain old telephone system ("POTS"). The service pools can include devices capable of providing POTS, xDSL, and other services. The service pools can be implemented in a remote terminal. Such a remote terminal can include a plurality of xDSL devices, and a plurality of POTS devices.

In some cases, the automated carrier layer includes one or more communication devices operable to receive a selection. In addition, the automated carrier layer can include one or more control devices operable to receive the selection from the communication device, and to provide a selector derived from the selection to the electromechanical cross-connect. The selector can indicate a chosen access source. The control devices can control the operation of one or more electromechanical cross-connects that are operable to route selected access sources to an associated subscriber line.

In various cases, the automated carrier layer includes similar cross-connect devices comprised of one or more communication devices operable to receive a selection. In addition, the automated carrier layer can include one or more control devices operable to receive the selection from the communication device, and to provide a selector derived from the selection to the electro-mechanical cross-connect that indicates a chosen access source. The control devices can control the operation of one or more electromechanical cross-connects that are operable to route selected network services to a subscriber line.

Other embodiments of the present invention provide methods for provisioning a data network. The methods include provisioning a number of service interfaces to support one of various network services. Each of the service interfaces is assigned to subscribers associated with the data network on an access-by-access basis. Further, at least one of the service interfaces is dynamically reprovisioned on an access-by-access basis to support a different one of the network services based on the number of the subscribers currently assigned to the plurality of service interfaces. In some cases, the one of the reprovisioned service interface is either an ADSL or a VDSL card. In various cases, one or more of the network services can include a high frequency transfer service, such as, for example, an xDSL service. As used herein, an xDSL technologies are any technology within the family of DSL technologies including, but not limited to, ADSL, ADSL2, ADSL2+, HDSL, HDSL2, HDSL4, and SHDSL.

In some instances, the methods further include receiving a configuration request in relation to the data network, and formatting the configuration request as a selector. The selector is communicated to a network device coupled to the data network. The network device includes a communication element that is operable to receive the selector, and an electromechanical cross-connect that is operable to route a source to an access point. A control device is also included to receive the selector from the communication device, and to provide a control signal derived from the selector to the electromechanical cross-connect. In some cases, the network device is maintained in an automated carrier layer remote from a central office where the selector is formatted at the central office.

In other cases, the network device is maintained in an automated service layer remote from a central office.

Yet other embodiments of the present invention provide systems for utilizing a plurality of service interfaces to support a plurality of network services. The systems include a control processor associated with a computer readable medium that includes instructions executable by the control processor to provision the plurality of service interfaces to support one of the network services. In addition, the instructions are executable to assign each of the plurality of service interfaces to a network subscriber on an access-by-access basis, and to dynamically reprovision at least one of the plurality of service interfaces to support a different one of the plurality of network services based on the number of subscribers currently assigned to each of the service interfaces, and corresponding features subscribed to by each of the subscribers.

The summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
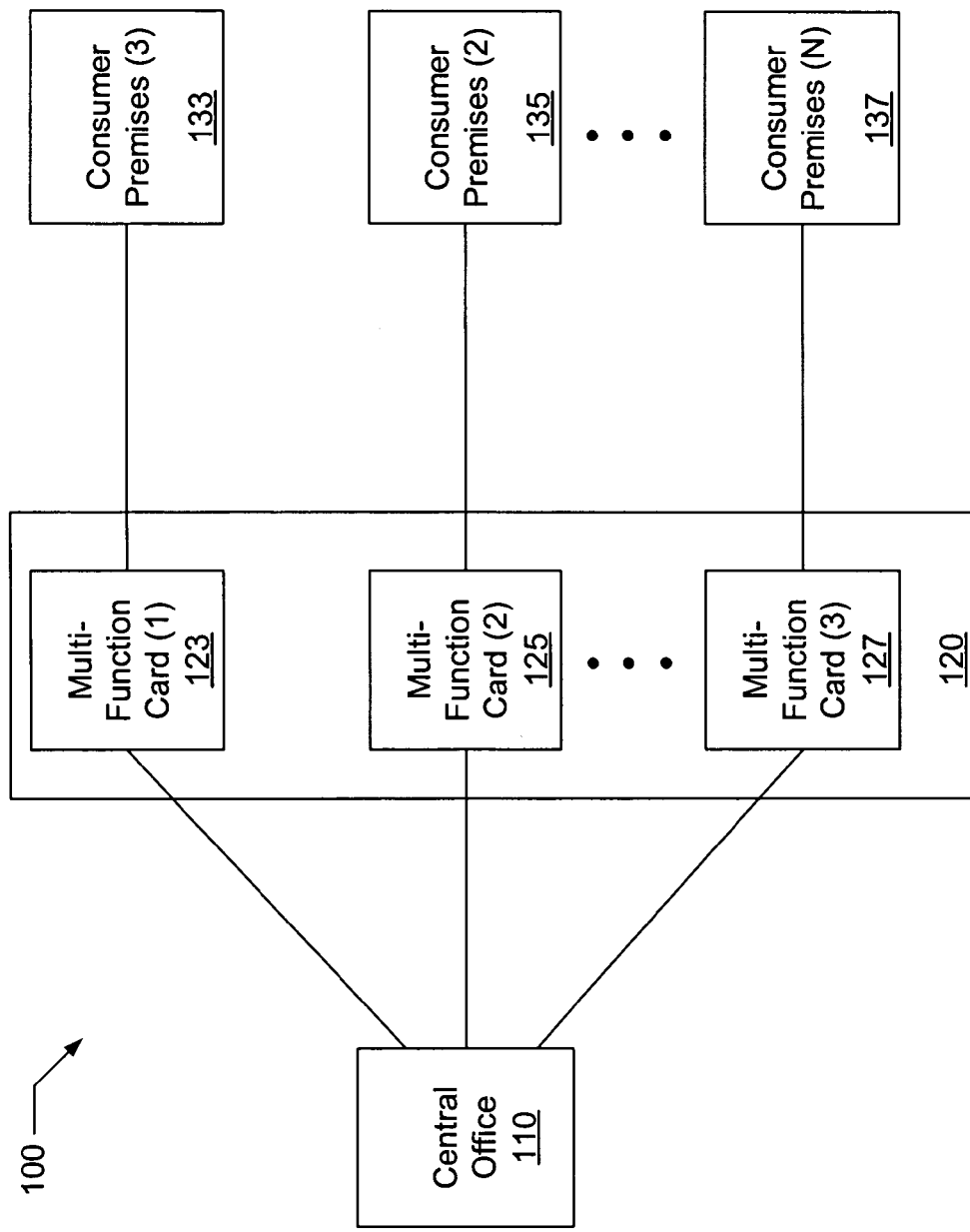
FIG. 1 is a representative diagram of a prior art telecommunications network including a one-to-one device assignment approach.

Among other things, the present invention provides systems and methods for pooling data services in relation to a telecommunications network. In doing so, the present invention provides a pooling approach that addresses the frequency response needed in relation to current high speed data networks and/or where packet based networks are employed. Further, the present invention provides systems and methods for automated cross-connecting of signals in a telecommunications network. Such cross-connecting can be provided in relation to accessing pooled network devices, and/or in relation to selecting between a plurality of access sources. In some cases, the polling approach is implemented via an automated service layer.

To provide a desirable frequency response, an electromechanical cross-connect can be employed. Such an electromechanical cross-connect can provide a physically switched approach that reduces the frequency filtering evident where transistor based switching is used. The control associated with the electromechanical cross-connect can be provided via a transistor based device, however, without degrading the frequency response.

In addition, various embodiments of the present invention provide for implementing an automated cross-box in relation to the automated service layer. In particular cases, the network being accessed is selected via the automated cross-box, while the network service and/or network service device being accessed is selected via the automated service layer. As used herein, an automated cross-box is any system capable of switching a selected access source to an access point. Such automated cross-boxes can be controlled from a central office, or other location remote from the cross-box, thus reducing the need to dispatch service technicians. An access source is any service provider associated with a given network. Thus, for example, an access source can be an xDSL provider, a local voice service provider, a long distance voice service provider, and the like. An access point is any avenue through which services of a network can be accessed. Thus, for example, an access point can be an xDSL connection at a consumer premises.

In some cases, the function of the automated cross-box can be implemented directly in other telecommunications equipment, thus reducing the need for a separate cross-box enclosure. In one particular case, the cross-box functionality can be implemented in telecommunications equipment located at a consumer premises. This can include, for example, providing cross-box functionality on a circuit card, or within a piece of consumer equipment. As just one example, automated cross-box functionality can be implemented in a network interface device as more fully described in U.S. patent application Ser. No. 10/356,364, entitled "PACKET NETWORK INTERFACE DEVICE AND SYSTEMS AND METHODS FOR ITS USE," filed Jan. 31, 2003 by Bruce A. Phillips et al.; U.S. patent application Ser. No. 10/356,688, entitled "SYSTEMS, METHODS AND APPARATUS FOR PROVIDING A PLURALITY OF TELECOMMUNICATION SERVICES," filed Jan. 31, 2003 by Bruce A. Phillips et al.; U.S. patent application Ser. No. 10/356,388, entitled "CONFIGURABLE NETWORK INTERFACE DEVICE AND SYSTEMS AND METHODS FOR ITS USE," filed Jan. 31, 2003 by Bruce A. Phillips et al., U.S. patent application Ser. No. 10/367,596, entitled "SYSTEMS AND METHODS FOR DELIVERING A DATA STREAM TO A VIDEO APPLIANCE," filed Feb. 14, 2003 by Steven M. Casey et al., U.S. patent application Ser. No. 10/367,597 entitled "SYSTEMS AND METHODS FOR PROVIDING APPLICATION SERVICES," filed Feb. 14, 2003 by Steven M. Casey et al. Each of the preceding applications. are assigned to an entity common herewith, and the entire disclosure of each of the aforementioned applications is herein incorporated by reference for all purposes.

In particular cases, the cross-connect function of the cross-box is implemented electronically in a non-transistor based switching approach. Such a cross-box can be implemented as one or more microelectromechanical system (MEMs) electromechanical switches that do not rely on transistors to switch one access source to another. In various cases, these switches can provide increased frequency response sufficient to allow a twisted pair plain old telephone system ("POTS") service to be electronically switched to an xDSL line card. Further, this capability can be implemented in a small, relatively inexpensive package when compared to larger electromechanical switches, and at the same time provide increased reliability and greater system integration.

Figure 2:
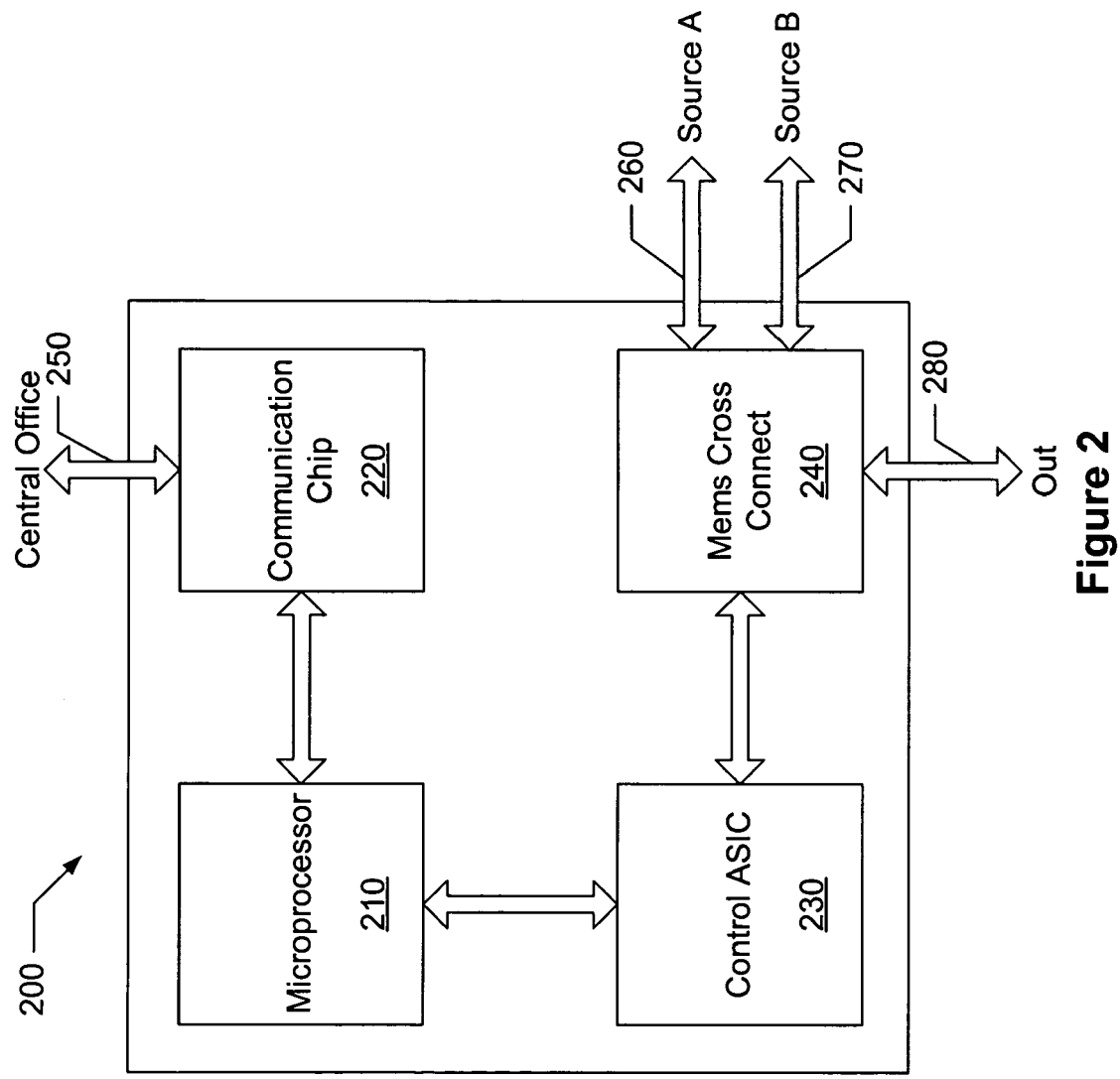
FIG. 2 is a block diagram of a automated cross-connect in accordance with some embodiments of the present invention.

Referring to FIG. 2, an automated cross-connect device 200 is illustrated in accordance with some embodiments of the present invention. Automated cross-connect 200 includes a microprocessor 210, a communication element 220, a control element 230, and an electromechanical cross-connect 240. Communication element 220 is coupled to a control source, such as a central office by a control medium 250. Electro-mechanical cross-connect 240 is coupled to two or more access sources via access source media 260, 270 and to an access point via an access point medium 280.

Microprocessor 210 can be any device capable of accessing and executing computer executable instructions. In some cases, microprocessor 210 can be implemented on the same die, or within the same semiconductor package as other elements of automated cross-connect device 200. In other cases, microprocessor 210 is a stand alone, imbedded processor as are known in the art. In such cases, microprocessor 210 can be placed on a circuit card with other elements of automated cross-connect device 200. In some cases, an external memory element, such as a read only memory (ROM) is provided with the microprocessor. Based on this disclosure, one of ordinary skill in the art will appreciate that the microprocessor can be coupled to a number of different memory types including, for example, random access memory (RAM) non-volatile ROM, and/or a database comprised of a hard disk drive, a floppy disk drive, a CD ROM, and/or the like.

Communication element 220 can be any device capable of receiving selection information in relation to automated cross-connect device 200. Further, in some cases, communication element 220 can be capable of transmitting information to the control source, or to other elements on the network. Based on this disclosure, one of ordinary skill in the art will appreciate the variety of communication devices that can be used to implement communication element 220.

The control information received by communication element 220 is received via control medium 250, that can be any medium for communicating control information from a control source to communication element 220. Thus, for example, control medium can be a fiber optic connection, a satellite connection, a copper twisted pair connection, a radio frequency (RF) connection, or the like. Further, control medium 250 can be any combination of the aforementioned media.

Control element 230 can be any device capable of communicating selection information to electromechanical cross-connect 240. Thus, for example, control element 230 can be an application specific integrated circuit (ASIC) with outputs that are compatible with electromechanical cross-connect 240. Alternatively, control element 230 can be implemented in software as part of microprocessor 210, and utilize outputs from microprocessor 210 to communicate with electromechanical cross-connect 240. Based on this disclosure, one of ordinary skill in the art will appreciate a number of different ways to implement control element 230.

In one particular embodiment, electromechanical cross-connect 240 is a MEMs device with a number of electromechanical switches implemented thereon. In some cases, electromechanical cross-connect 240 is implemented on a silicon substrate using various other materials to build the various switches and control circuitry thereon. Other types of substrates, including, but not limited to, gallium arsenide. Various embodiments of MEMs based electromechanical cross-connects are described below in relation to FIGS. 3 and 4.

In one particular embodiment of the present invention, communication element 220, microprocessor 210, and control element 230 are implemented on a single die. Automated cross-connect 200 can include one of these combination elements to control a number of electromechanical cross-connects 240 all implemented on another MEMs die. Thus, embodiments of the present invention can include a two chip solution capable of switching tens, or even hundreds of access sources to access points. Based on the disclosure provided herein, one of ordinary skill in the art will appreciate the myriad of combinations of some or all of the elements of automated cross-connect device 200 on semiconductor die, within semiconductor packages, and/or on circuit cards. For example, in yet another embodiment, a microprocessor is not included, and communication element 220, control element 230, and electromechanical cross-connect 240 are implemented on a common silicon substrate, and/or within a common semiconductor package.

Figure 3A:
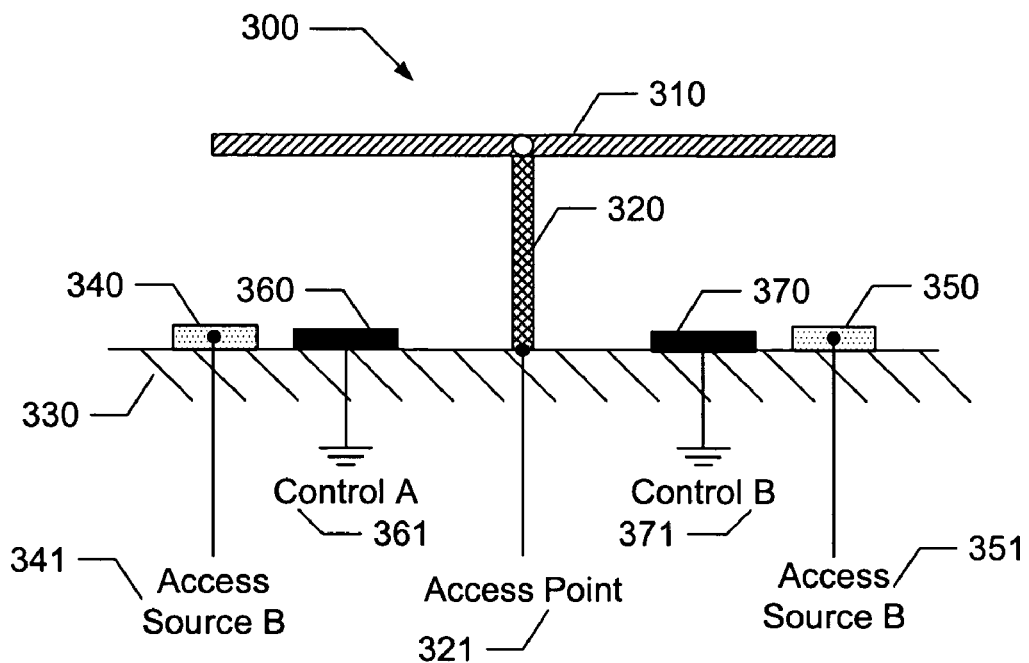
FIGS. 3A-C show an exemplary embodiment of a MEMs based electromechanical switch useful in relation to various embodiments of the present invention.

Turning now to FIG. 3a, a MEMs based electromechanical switch 300 useful in relation to the present invention is depicted. Switch 300 includes a conductive cantilever 310 supported by a conductive pivot 320. Conductive pivot 320 is disposed on a semiconductor substrate 330. Contacts 340, 350 and actuators 360, 370 are also disposed on semiconductor substrate 330. Contact 340 is electrically coupled to one access source 341, and contact 350 is electrically coupled to another access source 351. Conductive pivot 320 is electrically coupled to an access point 321.

Figure 3B:
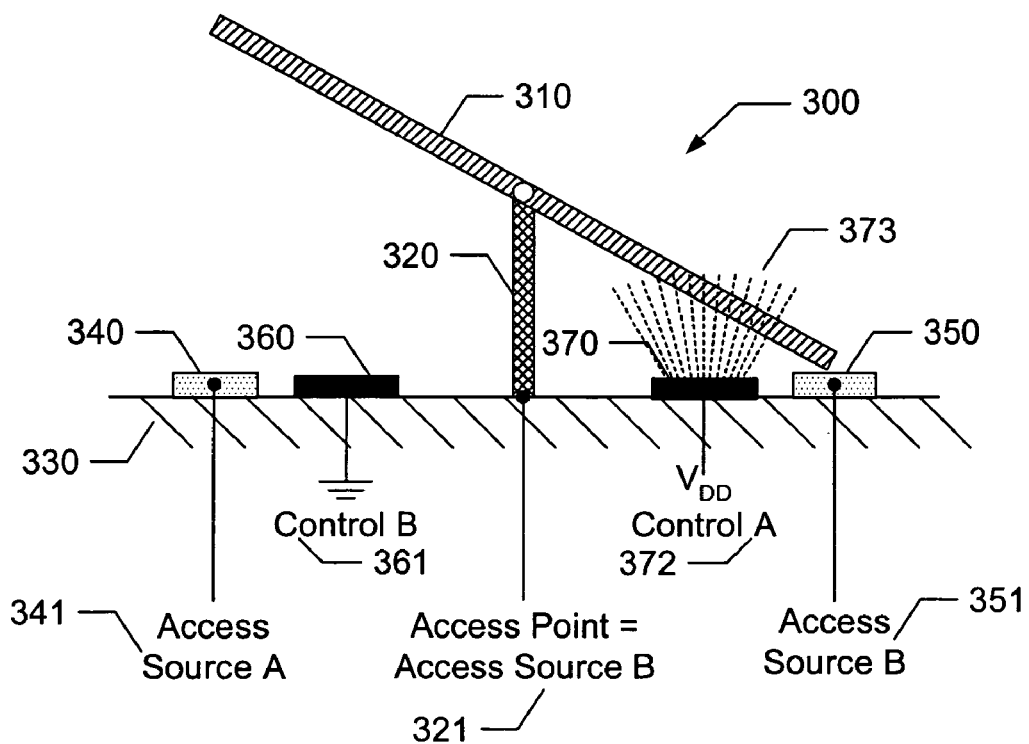
Figure 3C:
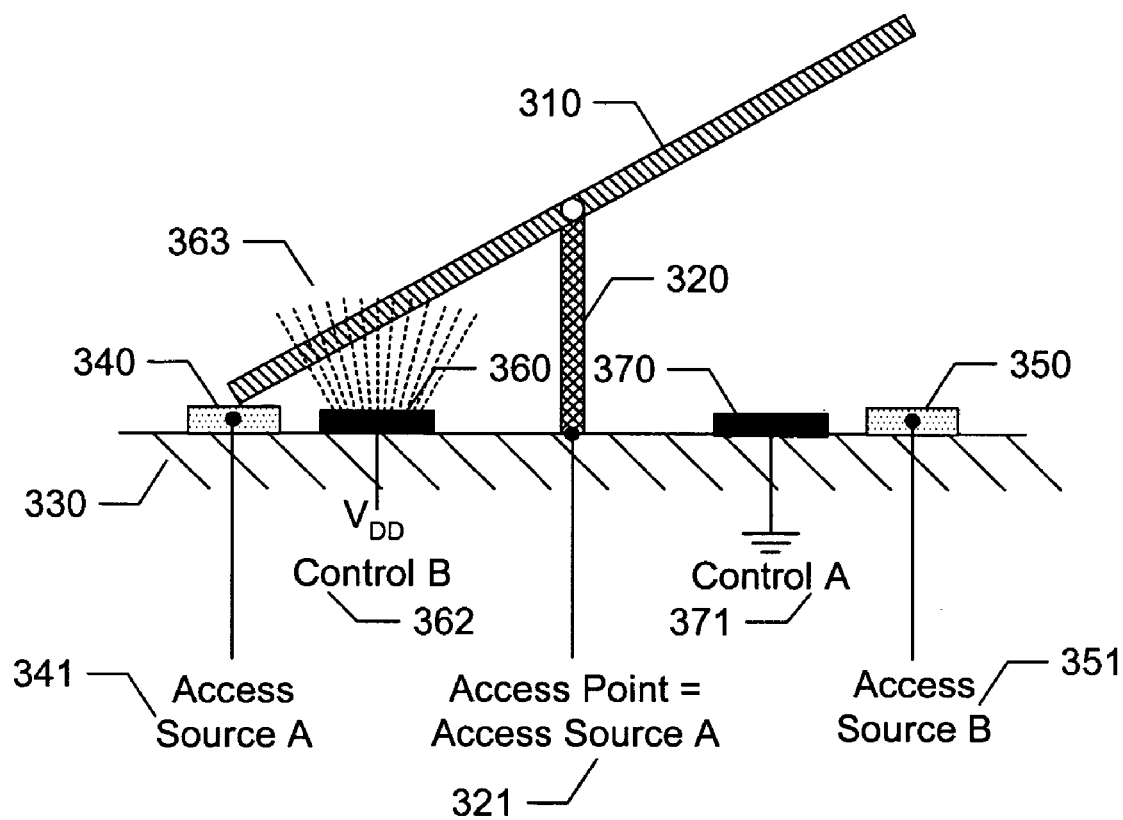

As illustrated in FIG. 3b, to select access source 351 for coupling to access point 322, a voltage 372 (e.g., a control signal) is applied to actuator 370. This generates an electrical field 373 depicted as dashed lines. This electric field causes cantilever 310 to deflect until cantilever 310 comes into contact with contact 350. An electrical connection is formed from contact 350 to conductive pivot 320. Thus, access point 321 is electrically coupled to access source 351. Similarly, as illustrated in FIG. 3c, a selection coupling access point 321 to access source 341 is effected by applying a voltage 362 to actuator 360.

Figure 4:
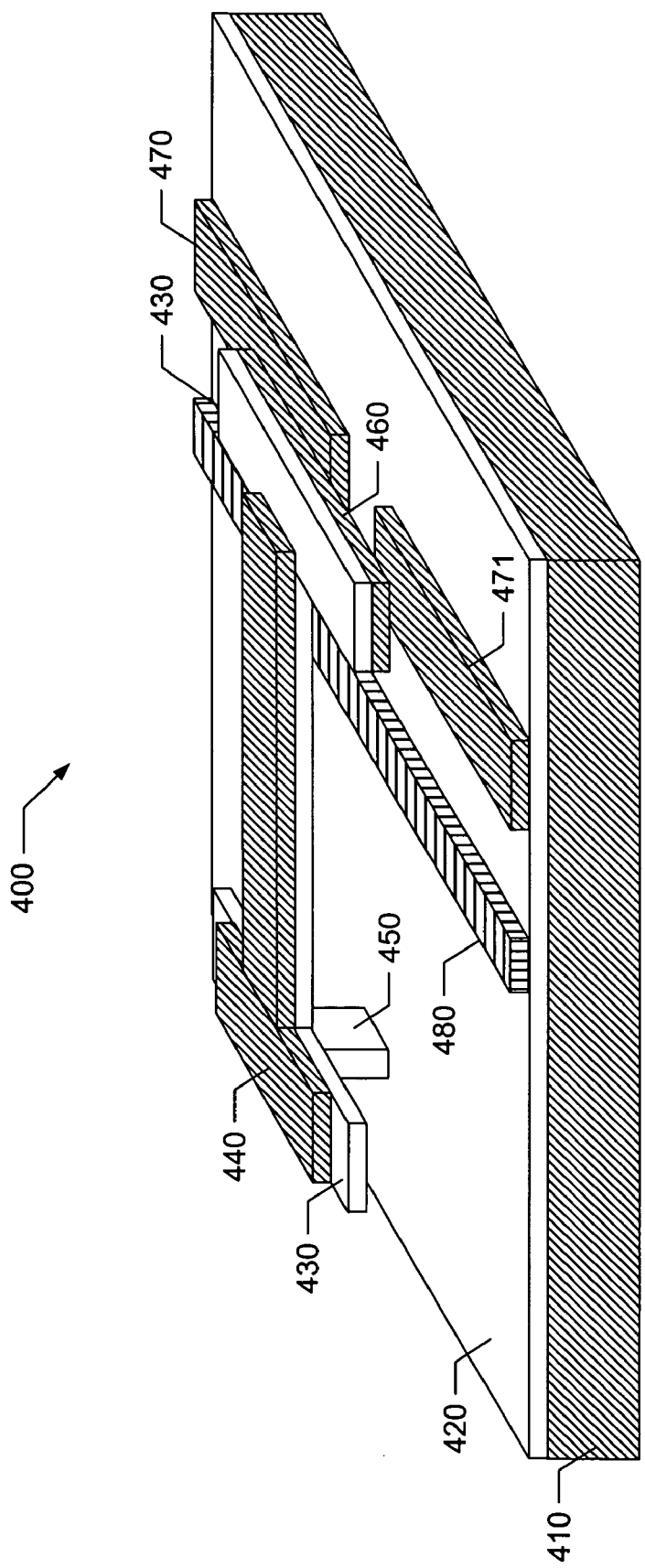
FIG. 4 illustrates another embodiment of a MEMs based electromechanical switch useful in relation to other embodiments of the present invention

FIG. 4 illustrates another example of a MEMs based electromechanical switch 400 useful in accordance with the present invention. Switch 400 includes a semiconductor substrate 410 with an insulating layer 420, such as silicon dioxide disposed thereon. A pivot 450, a bottom actuator 480, and a switch path 470, 471 are formed over insulating layer 420, and an insulating cantilever 430 and a top actuator 440 are supported by pivot 450. A metallic contact 460 is formed on the underside of cantilever 430. In operation, a voltage is applied between top actuator 440 and bottom actuator 480 causing cantilever 430 to deflect until metallic contact 430 contacts switch path 470, 471, thus completing a conductive path from segment 470 to segment 471. Based on the disclosure provided herein, one of ordinary skill in the art will appreciate that a variety of MEMs based electromechanical switches can be used in relation to the present invention.

Figure 5A:
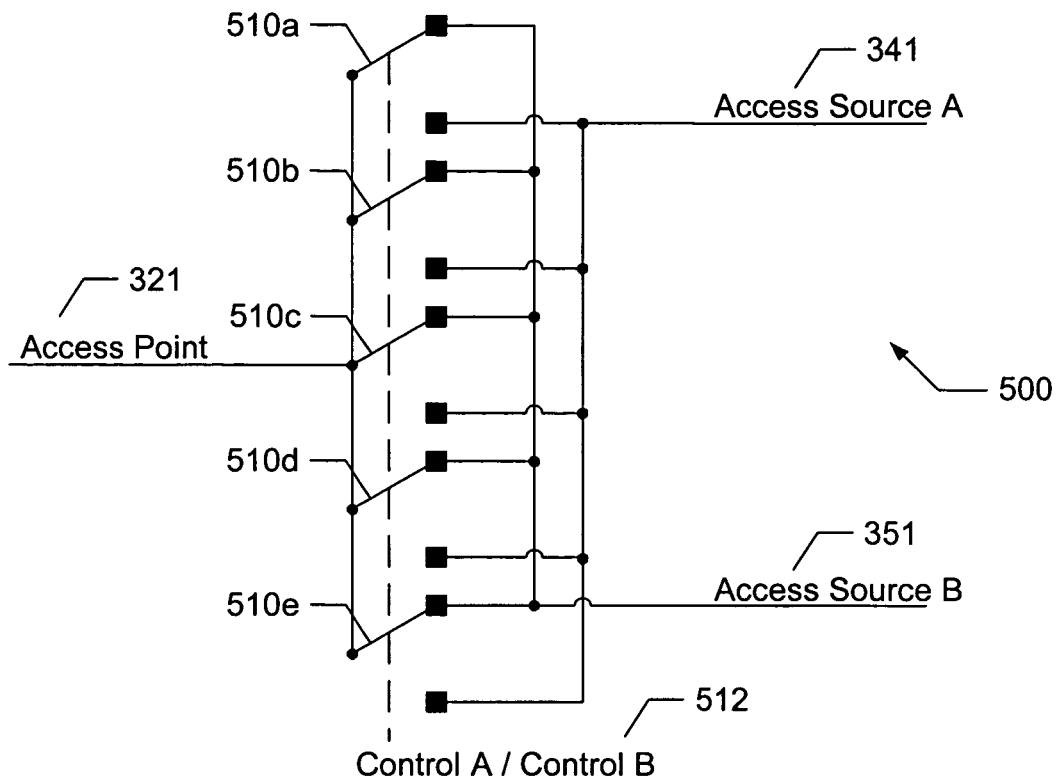
FIGS. 5A-C illustrate various redundant switch configurations in accordance with some embodiments of the present invention.

FIG. 5 illustrate various redundant switch configurations in accordance with some embodiments of the present invention. Referring to FIG. 5a, a switch 500 couples one of access source 341 or access source 351 to access point 321. Switch 500 includes multiple switch paths 510 controlled by common control circuitry 512. In operation, when one of switch paths 510 is directed to switch from access source 341 to access source 351, or vice versa, all of switch paths 510 are switched. Thus, if one or more of switch paths 510 fail to switch, the selected coupling will still occur as others of switch paths 510 will complete the desired circuit. In some embodiments, switch 500 is designed such that a failing switch will return to an open position (e.g., neither access source 341 nor access source 351 being selected). Further, the devices can be designed such that completion of any of switch paths 510 is sufficient to provide the desired coupling.

In particular embodiments, a current detection, or other operation detection device as known to those of ordinary skill in the art can be implemented in relation to each of switch paths 510. Thus, when one of switch paths 510 fails to close, no current is detected, and a partial failure of the device can be communicated via communication element 220 to a central office. Thus, a subscriber accessing a network via access point 321 never sees the impending failure as at least one of switch paths 510 properly closes, but an entity maintaining the network can be alerted to the potential failure of the network, and make efforts to avoid the failure by, for example, replacing the electromechanical cross-connect. Based on the disclosure provided herein, one of ordinary skill in the art will recognize that such switches can be combined in switch networks capable of coupling an access point to one of three or more access sources.

Figure 5B:
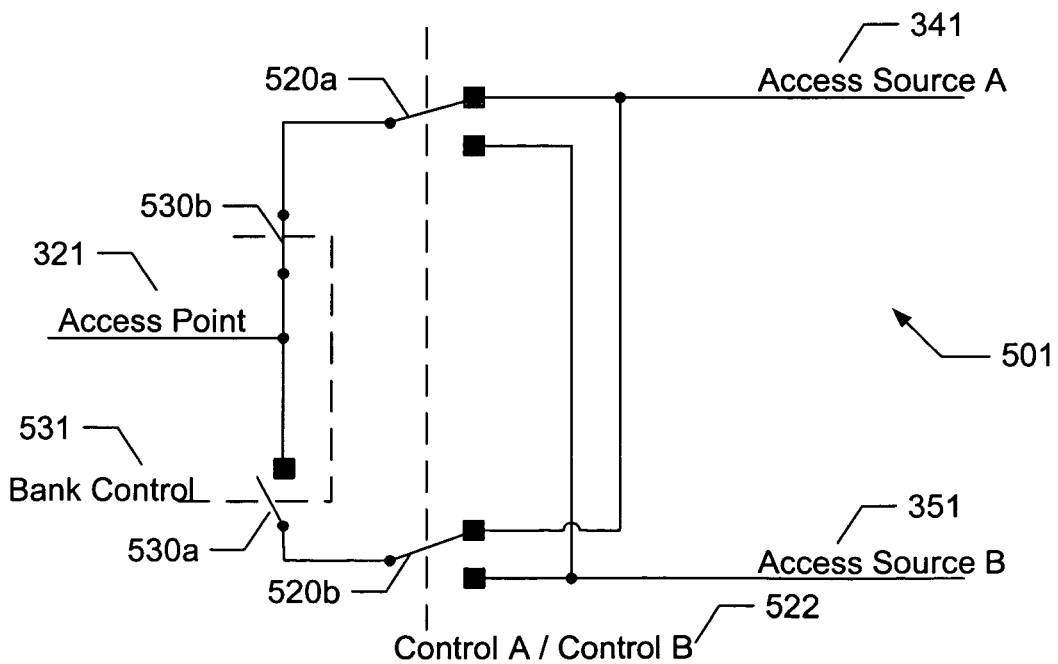

FIG. 5b depicts another exemplary redundant switch 501 in accordance with other embodiments of the present invention. Switch 501 couples one of access source 341 or access source 351 to access point 321. Switch 501 includes multiple switch paths 520 controlled by common control circuitry 522. In operation, one of switch paths 520 are selected via bank control 531 that controls bank switches 530. Thus, when bank switch 530a is closed, switch path 520b is the current carrying path. In contrast, when bank switch 530b is closed, switch path 520a is the current carrying path. Thus, if switch path 520a fails, bank control 531 can be changed, and a non-failing switch path 520b can be selected.

Figure 5C:
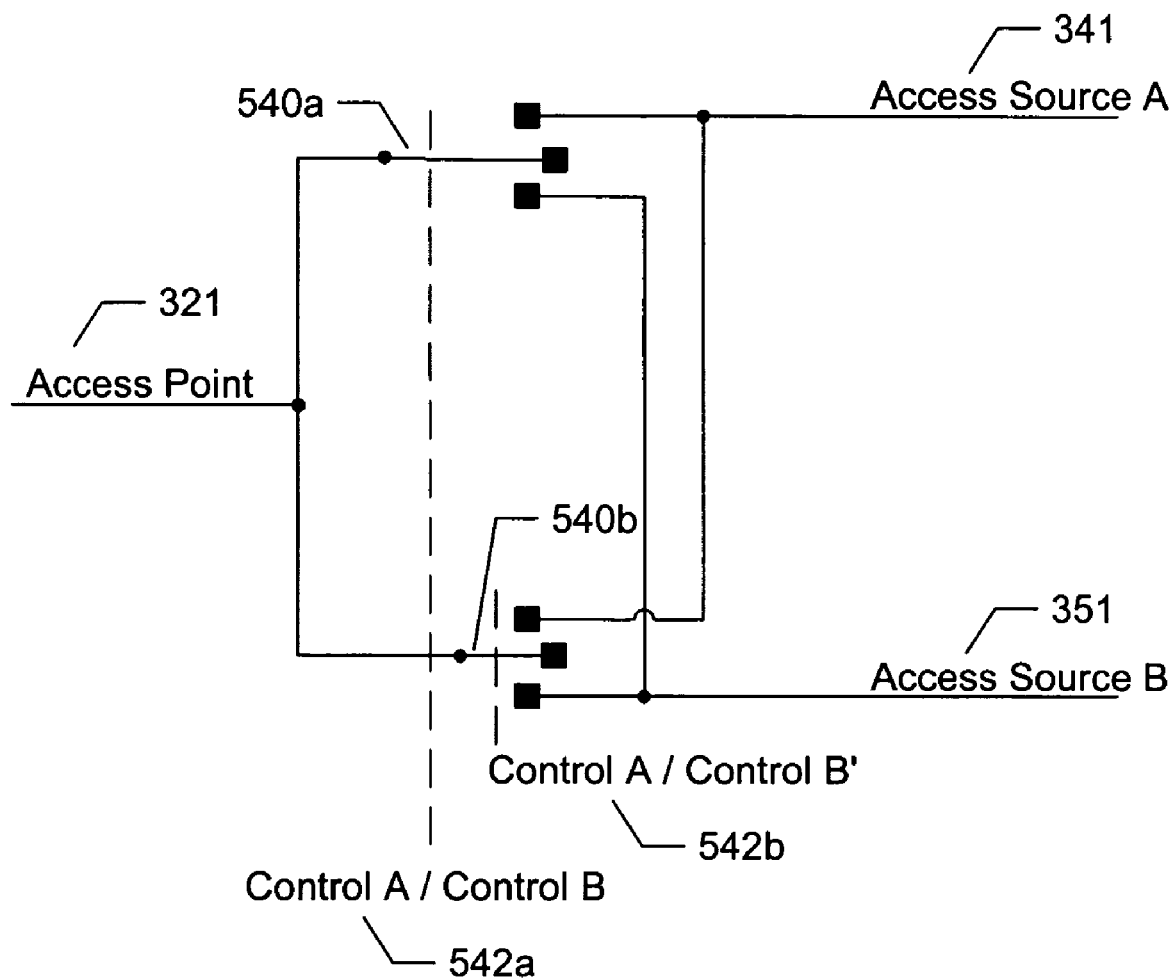

FIG. 5c illustrates yet another exemplary redundant switch 502 in accordance with other embodiments of the present invention. Switch 502 couples one of access source 341 or access source 351 to access point 321. Switch 502 includes multiple switch paths 540 controlled by common control circuitry 542. In operation, one or both of switch paths 540 are selected via common control circuitry 542 to direct access from access source 341 or to access source 351. Thus, if one or more of switch paths 540 fail, the other of switch paths 540 can be selected to complete the desired circuit. In some embodiments, switch 502 is designed such that a failing switch returns to an open position, or center position. Further, the devices can be designed such that completion of any of switch paths 540 is sufficient to provide the desired coupling.

Some embodiments of the invention further provide for switching between services and/or service ports using the aforementioned switching approach. Thus, a remote terminal or other telecommunications device can be implemented to include pooling resources. The network operator then utilizes the pool of resources on an as needed basis. This eliminates the need for multi-function cards that can only be used to perform one function at a time. Thus, for example, a combo card currently used can include both ADSL and POTS technology. Both functions are dedicated to a single access point. When the POTS service or the ADSL service is not being utilized, it cannot be utilized by another subscriber.

Further, if the subscriber associated with the access point decides to switch from ADSL to VDSL, a technician must be dispatched to switch the line card associated with the subscriber. This is costly. By pooling in accordance with the present invention, a remote terminal can include a variety of POTS, VDSL, ADSL, and other card types. These cards can be used by various subscribers on an as needed basis, thus reducing the cost of providing and maintaining a network.

Figure 6:
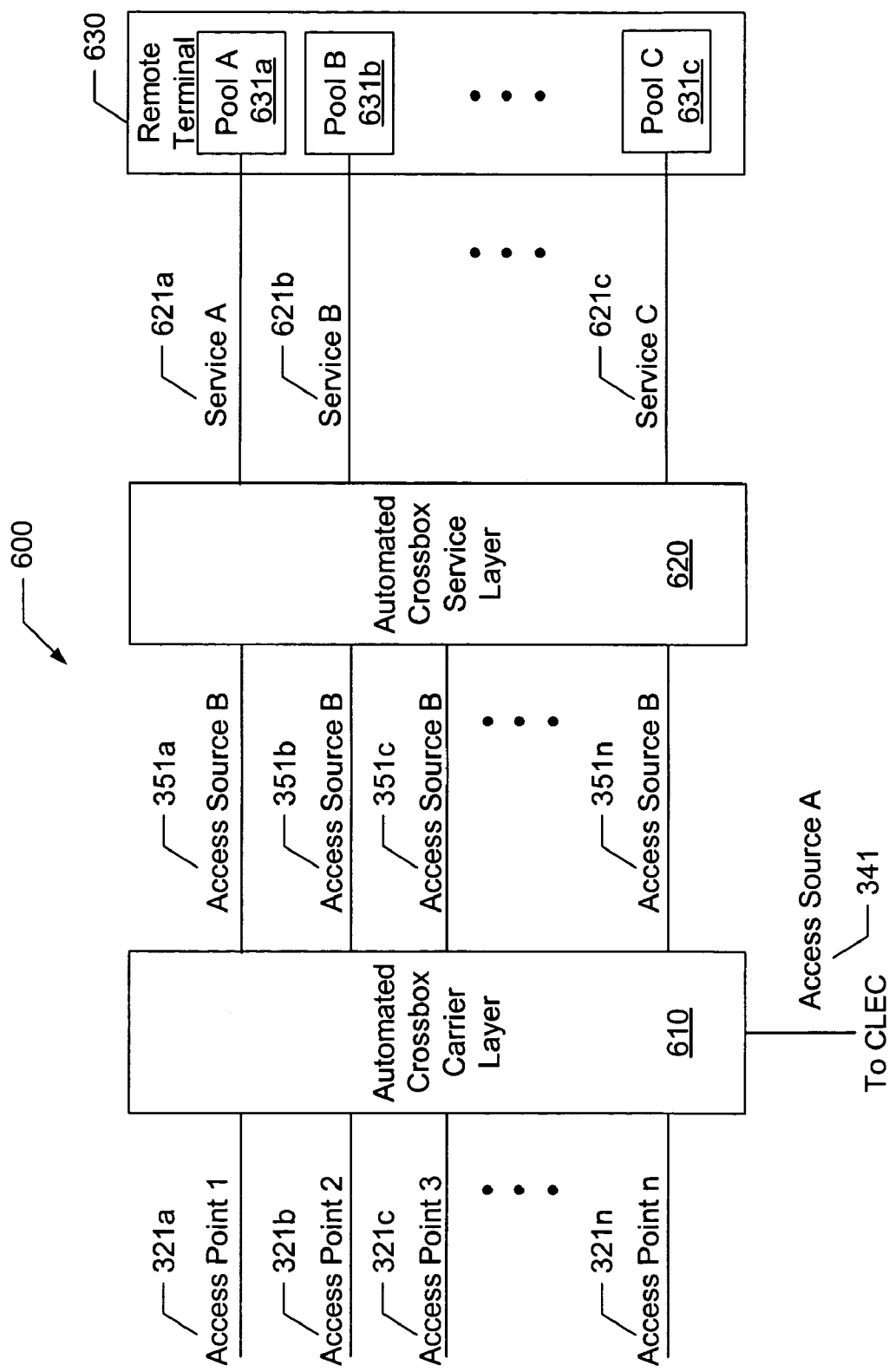
FIG. 6 illustrates a network resource pooling and/or cross-connect in accordance with some embodiments of the present invention.

FIG. 6 illustrates one such switching system 600 that is capable of switching between a variety of network services arranged in service pools 631, and provided in a remote terminal 630. System 600 includes an automatic cross-box carrier layer 610 capable of selectively coupling access source A 341 or access source B 351 on an individual basis to a number of access points 321. Automated cross-box carrier layer 610 can be implemented as previously discussed.

Either or both of access source A 341 and access source B 351 can be coupled to an automated cross-box service layer 620. As depicted, access source B 351 is coupled to automated cross-box service layer 620 that is capable of selectively coupling one (or in some cases, multiple) of service types 631 to access source B 351, and ultimately to access point 321. Automated cross-box service layer 620 can comprise MEMs based switches as previously described. Such MEMs based switches can be switched upon commands generated remote from automated cross-box service layer 620. Further, such switches can support high frequency network signals without degrading the signals as would occur in transistor based switching.

Service pools 631 can include groups of devices, or service interfaces, that provide services that can be accessed by subscribers associated with access points 321. Such services can include always on xDSL services, on demand xDSL services, ISDN services, low rate modem services, caller identification services, video access services, cable modem services, and a variety of voice services. Such voice services are more fully described in U.S. Pat. No. 5,974,331. The entirety of the aforementioned patent is incorporated herein by reference for all purposes. The approaches for pooling and dynamically provisioning discussed in the aforementioned patent are applicable to the present invention that additionally provides devices, systems and methods that inventively make such approaches useful in relation to high speed network switching.

Thus, as just one example, pool A 631a can be provided to service xDSL access, and thus may include a group of xDSL line cards. By pooling, an xDSL line card does not need to be dedicated to each access point 321 that includes a subscription to xDSL services. Rather, because all access points 321 are not constantly accessing xDSL services, xDSL line cards can be dynamically provisioned to provide xDSL services to a utilized access point 321, and when that access point 321 becomes inactive, the same line card can be dynamically provisioned to provide access services to another access point 321. Thus, the present invention provides a mechanism that can reduce the number of network devices that must be provided to support a given number of access points.

In addition, increased service levels can be supported. For example, pool A 631a can include xDSL line cards used to provide always on xDSL service, or some premium xDSL service. Pool B 631b can also include xDSL line cards used to provide a lower, a delayed on demand service level. Thus, the first service level may include a greater number of xDSL line cards for a given number of access points 321 than would be provided for the lower level of service. However, when line cards assigned to pool A 631a are not being utilized, they can be dynamically reassigned to pool B 631b, and thus temporarily increase the performance of the lower level service. The temporarily reassigned xDSL line card can then be assigned back to its original pool A 631*a* when it is needed to support the higher service level. Based upon the disclosure provided herein, one of ordinary skill in the art will appreciate a number of different services and/or service levels that can be supported using such a system. Further, one of ordinary skill in the art will understand that various pooling and/or access approaches can be applied in relation to the present invention. For example, an unutilized xDSL line card can be assigned to an unused group, and when additional resources are required, one of the xDSL line cards can be added on a round robin basis, thereby spreading the utilization somewhat evenly across the various line cards. Other more or less complicated approaches can be used for a variety of reasons.

Figure 7:
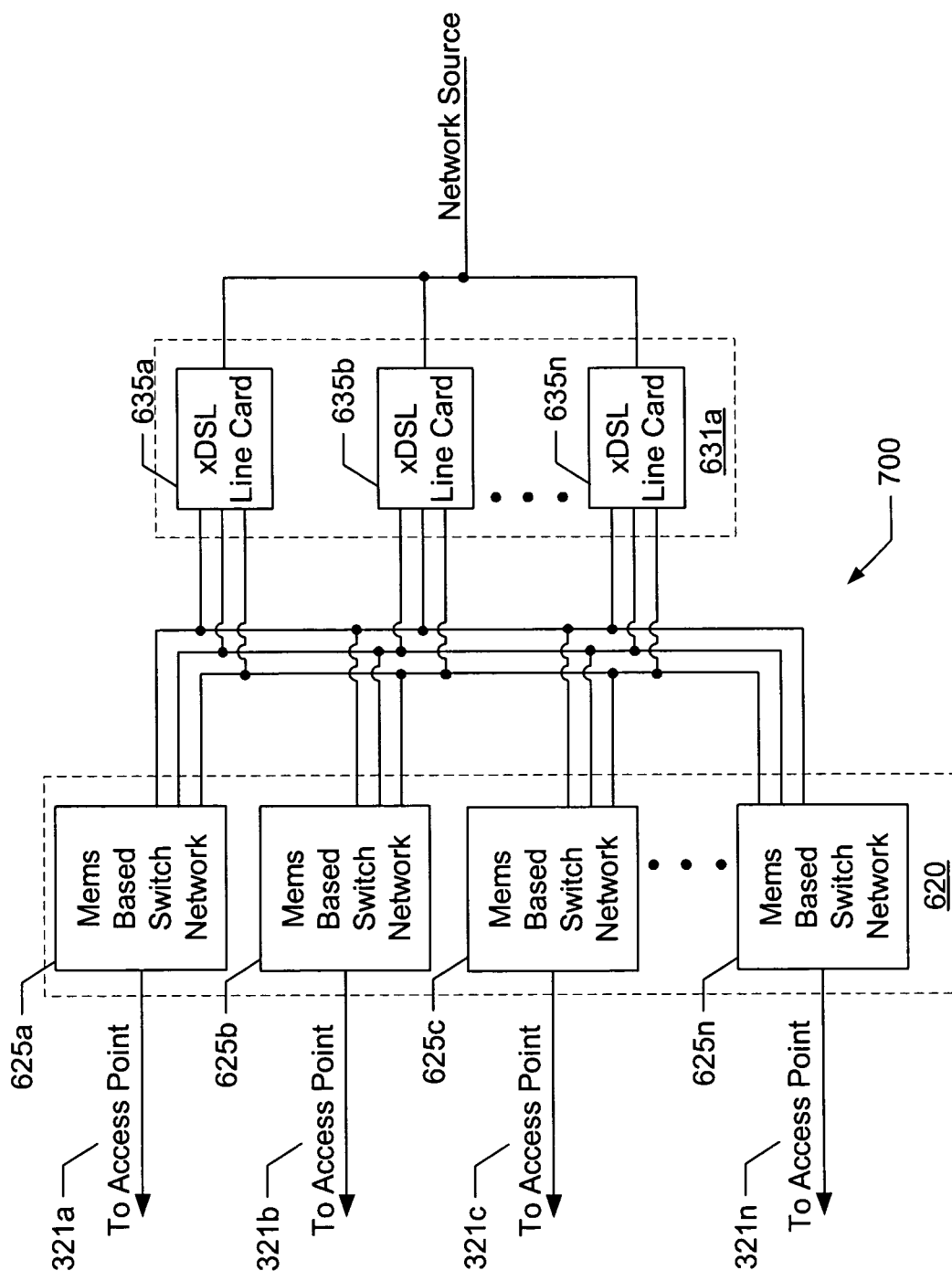
FIG. 7 illustrates a section of the system depicted in FIG. 6.

FIG. 7 illustrates one embodiment of a section 700 of system 600. Section 700 includes a number of MEMs based switch networks 625 that could be included as part of automated cross-box service layer 620. Each of switch networks 625 provides service selection for a particular access point 321. In addition, each of switch networks 625 are coupled to a number of service devices 635 (in this case xDSL line cards), that can be included within pool A 631*a* as previously described. In operation, when access point 321*a* is actively using the service associated with service devices 635, one of the various service devices is assigned to access point 321 a. Once access point 321 becomes inactive, the previously assigned service device 635 is released to the pool of unused service devices 635, and can then be reassigned to the next used access point 321. In this way, a line card does not need to be dedicate to each access point 321, but rather can be dynamically assigned in a pooled approach allowing the number of line cards required to be reduced. This pooling process and located at a central network location, or at a remote location.

Figure 8:
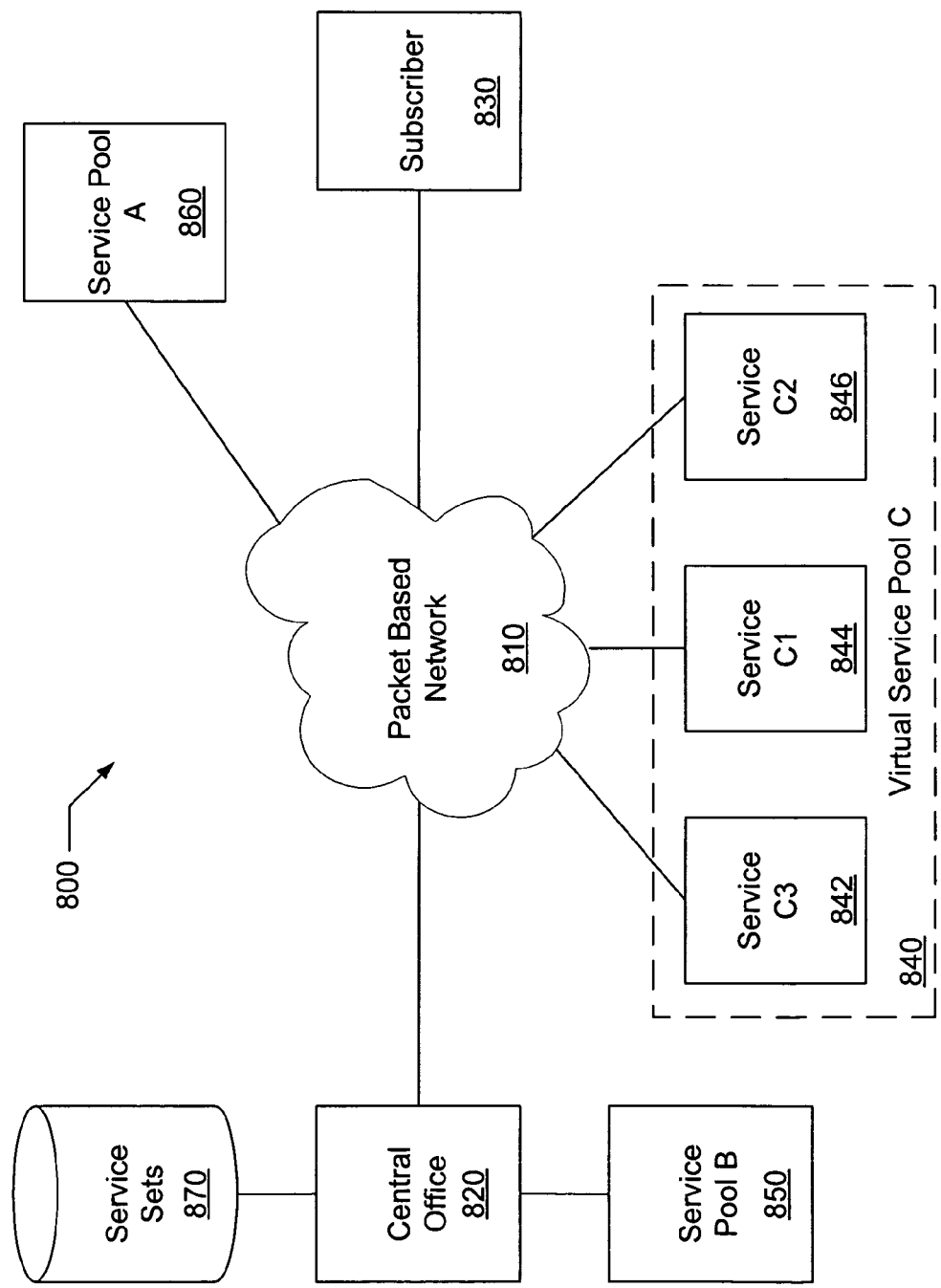
FIG. 8 illustrates a packet based network including both physical service pools and virtual service pools in accordance with some embodiments of the present invention.

Turning to FIG. 8, a packet based network system 800 including both physical service pools 850, 860 and a virtual service pool 840 in accordance with some embodiments of the present invention is illustrated. As illustrated, system 800 includes a central office 820 communicably coupled to a service set database 870, one or more subscribers 830, and a number of service pools 840, 850, 860. Service set database 870 includes a variety of business rules for selecting an appropriate service pool to provide a service requested by subscriber 830.

Service pools 840, 850, 860 are comprised of one or more service devices (i.e., service interfaces), such as line cards and the like for providing one or more services to subscriber 830. In physical service pools 850, 860, the various service devices are available from a common physical location. Thus, for example, a remote terminal such as that illustrated in FIG. 6 may include a number of service devices providing a common service type. In contrast, virtual service pool 840 includes a number of service devices 842, 844, 846 that can be communicably coupled to packet based network 810, but implemented at different physical locations. As depicted, service pool 850 is communicably coupled directly to central office 820, while service pool 860 is communicably coupled to central office 820 via packet based network 810. Such an approach allows third party providers to provide and maintain service pools that can be accessed under the direction of central office 820. In addition, virtual service pool 840 allows for third party providers to provide one or more individual devices that can be accessed and used under the direction of central office 820. Thus, as just one example, an individual user communicably coupled to packet based network 810 can lease excess bandwidth associated with service devices maintained by the user to subscriber 830 via central office 820.

Using system 800, subscriber 830 can request a service, such as xDSL services, telephone services, or the like via a request to a central office 820 across packet based network 810. Central office 820 identifies subscriber 830, and access service set database 870 to identify a set of services to which subscriber 830 subscribes. Within the set of services, central office 820 identifies the service appropriate for fulfilling the request of subscriber 830, and a service pool 840, 850, 860 that provides the identified service. In addition, central office 820 can arbitrate between the various service devices within the selected service pool to select a service device that exhibits a loading consistent with fulfilling the request of subscriber 830 and/or the subscription terms of subscriber 830. This device is then referred to subscriber 830 and can be used by subscriber 830 to complete the requested action. Alternatively, central office 820 may redirect subscriber 830 to a selected service pool, and the selected service pool arbitrates to identify a service device within the service pool to fulfill the request of subscriber 830.

Figure 9:
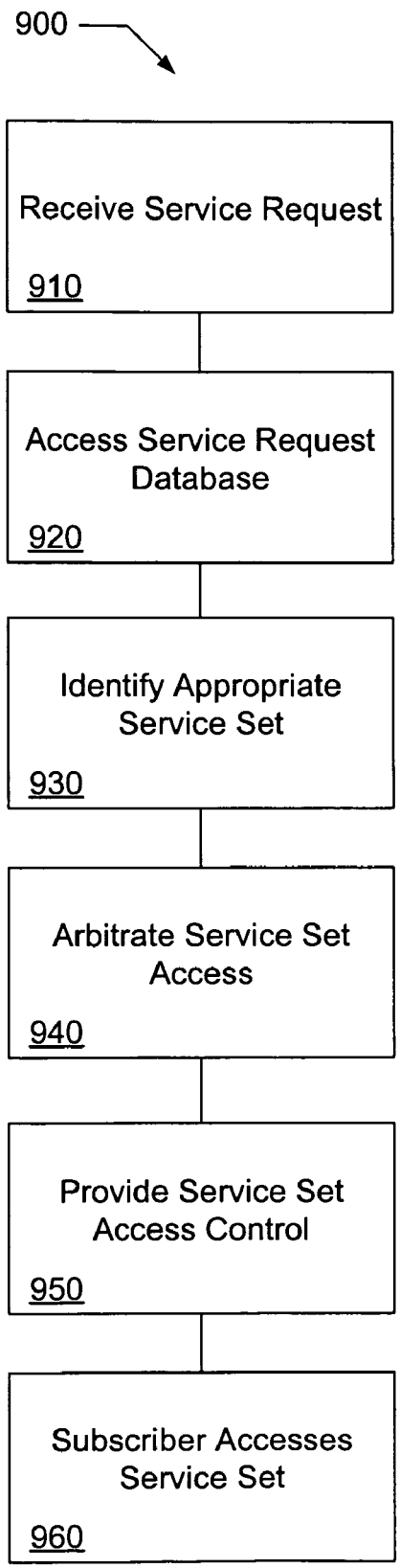
FIG. 9 is a flow diagram illustrating one signaling method in accordance with some embodiments of the present invention.

Turning now to FIG. 9, a flow diagram 900 illustrates one signaling method that can be applied to either or both of the systems depicted in FIGS. 6 and 8 in accordance with various embodiments of the present invention. Following flow diagram 900, a service request is received (block 910). In some cases, this service request is received from a subscriber by a central office providing contracted network services to the subscriber. A service request database is then accessed to identify the subscriber, and the various services and/or levels of services to which the subscriber has access (block 920). The request of the subscriber is used to determine an appropriate service pool to provide the service set needed to complete the request (block 930).

An arbitration is then performed to identify a service device within the service pool that can provide the requested service (block 940). This arbitration can select the least loaded service device, the highest performance service device, the service device available at the least cost, a service device maintained by the central office as preferable over one maintained by a third party, or a service device meeting some combination of the aforementioned criteria. Based on the disclosure provided herein, one of ordinary skill in the art will recognize a number of other criteria and/or combinations thereof that can be applied to select a service pool and/or a service device within the service pool.

The selected service device is then identified to the requesting subscriber (block 950), and the subscriber can then access the selected service device to complete the requested transaction (block 960). In some cases, this redirection from the central office where the initial request is initiated to the service device that actually handles the transaction is transparent to the subscriber, but rather is handled automatically by the access device used by the subscriber.

The invention has now been described in detail for purposes of clarity and understanding. However, it will be appreciated that certain changes and modifications may be practiced within the scope of the appended claims. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A dynamically provisioned telecommunications system, the system comprising:

a control module adapted to:
  receive from a central office an identification of a selected access source to be communicatively coupled with a subscriber line, the selected access source being one of a plurality of access sources and adapted to provide a first telecommunications service from a first of a plurality of service pools; and
  generate a switch control signal as a function of the received identification; and
an electromechanical cross connect, comprising:
  an electromechanical switch, communicatively coupled with the control device, and adapted to operate in at least a first mode and a second mode, wherein:
    the electromechanical switch provides a communicative coupling between the selected access source and the subscriber line when operating in the first mode;
    the electromechanical switch provides a communicative coupling between a second of the plurality of access sources and the subscriber line when operating in the second mode, the second of the plurality of access sources being adapted to provide a second telecommunications service from a second of the plurality of service pools; and
    the electromechanical switch is adapted to receive the switch control signal and switch to the first mode in response to the control signal, thereby providing the subscriber line with access to the first telecommunications service via the selected access source when operating in the first mode;
  wherein the control module and the electromechanical cross connect are collocated within telecommunications equipment, the telecommunications equipment being located at a subscriber premises associated with the subscriber line, the subscriber premises being located remote from the central office.

2. The system recited in claim 1 wherein at least one of the access sources comprises a high-frequency access source.

3. The system recited in claim 2 wherein the high-frequency access source comprises an xDSL access source.

4. The system recited in claim 3 wherein at least a second of the access sources comprises a plain-old-telephone-system service.

5. The system recited in claim 1 further comprising an automated service layer configured to direct an access request associated with the subscriber line to the first of the plurality of service pools.

6. The system recited in claim 1, further comprising a terminal that includes a plurality of xDSL devices comprised by the first of the plurality of service pools and a plurality of plain-old-telephone-system devices comprised by the second of the plurality of service pools.

7. A method for provisioning a telecommunications network, the method comprising:
  receiving from a central office an identification of a selected access source to be communicatively coupled with a subscriber line, the selected access source being one of a plurality of access sources, each of the plurality of access sources being coupled with the subscriber line and adapted to provide a telecommunications service from a respective one of a plurality of service pools to the subscriber line;
  generating a switch control signal as a function of the received identification;
  operating an electromechanical cross connect into a state that provides an electrically conductive path from the selected access source to a subscriber line in response to the switch control signal; and
  routing the telecommunication service from the one of the plurality of service pools respective to the selected access source to the subscriber line through the electrically conductive path,
  wherein the receiving, operating, and routing steps occur in proximity to a subscriber premises associated with the subscriber line, the subscriber premises being located remote from the central office.

8. The method recited in claim 7 wherein at least one of the access sources comprises a high-frequency access source.

9. The method recited in claim 8 wherein the high-frequency access source comprises an xDSL access source.

10. The method recited in claim 9 wherein at least a second of the access sources comprises a plain-old-telephone-system service.

11. The method recited in claim 7 further comprising directing an access request associated with the subscriber line to a selected one of the plurality of service pools.

12. The method recited in claim 11 wherein one of the service pools comprises a plurality of xDSL devices and another of the service pools comprises a plurality of plain-old-telephone-system devices.

* * * * *